Jan. 11, 1966     S. DORNIER     3,228,119
TRAINING APPARATUS FOR HELICOPTER PILOTS
Filed March 26, 1963
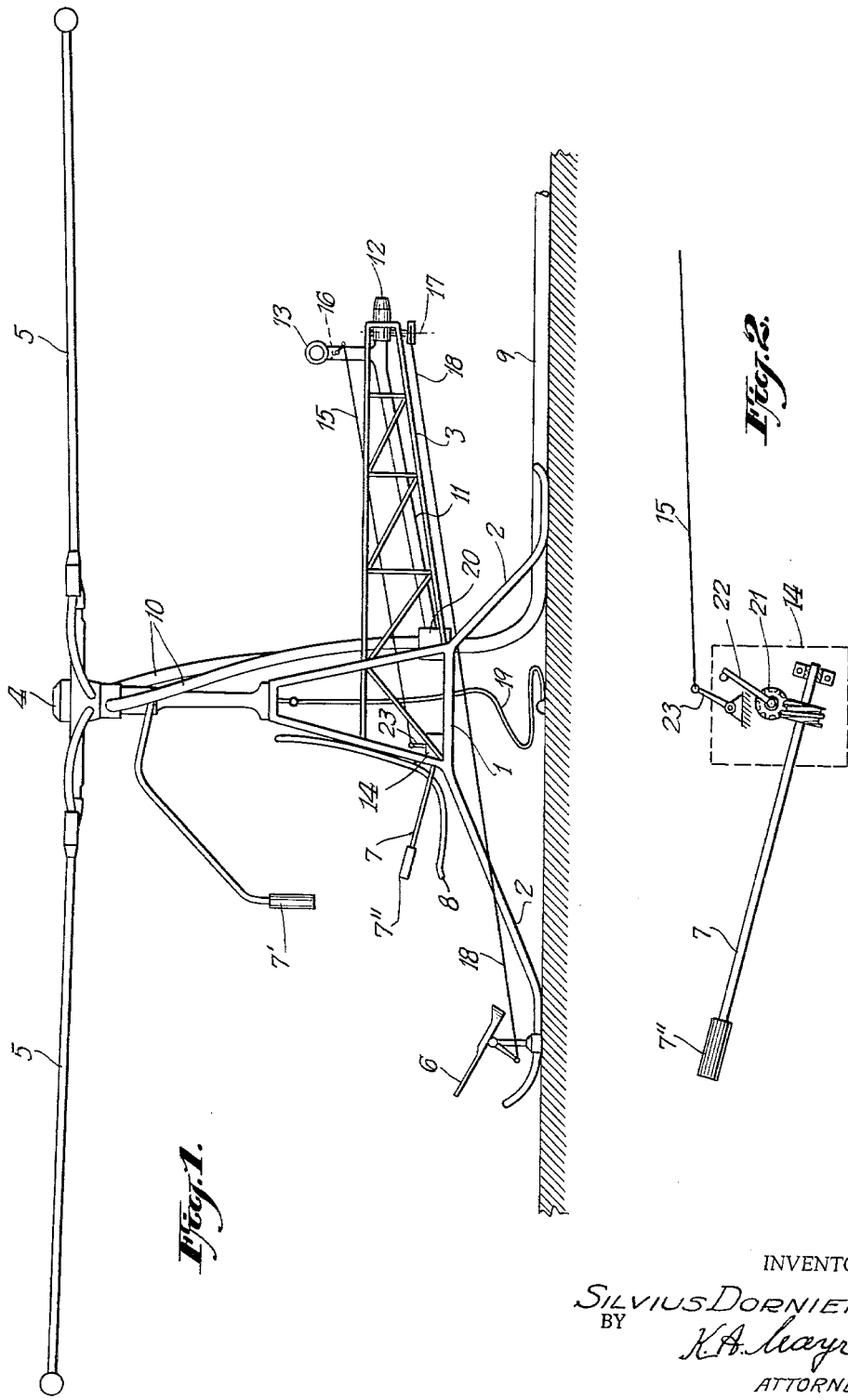
INVENTOR.
SILVIUS DORNIER.
BY
K.A. Mayr
ATTORNEY.

United States Patent Office 3,228,119
Patented Jan. 11, 1966

3,228,119
TRAINING APPARATUS FOR HELICOPTER PILOTS
Silvius Dornier, Friedrichshafen, Germany, assignor to Dornier-Werke G.m.b.H., Friedrichshafen, Germany, a firm of Germany
Filed Mar. 26, 1963, Ser. No. 268,004
Claims priority, application Germany, Mar. 28, 1962, D 38,510
7 Claims. (Cl. 35—12)

The present invention relates to an apparatus for training helicopter pilots.

Training devices are known which do not leave the ground and simulate actual flying conditions by complicated devices which indicate the flying conditions by means of gages or optical presentations. These devices do not simulate the dynamic instability of a hovering helicopter. A training device has been proposed in patent application Serial No. 266,735, filed March 20, 1963 which has no power unit of its own and wherein the rotor is driven by reaction of an expanding gas, for example compressed air, which is supplied through a flexible conduit from a plant resting on the ground. The last mentioned training device may leave the ground and is anchored thereto so that the height to which it may rise is very limited. This training device, however, gives the trainee the feel of the dynamic instability of a hovering helicopter. Because of the jet reaction drive of the rotor no stern rotor or other means for counteracting the torque produced by a motor-driven rotor is required. The trainee is not distracted by attending to torque compensation and can concentrate on counteracting the dynamic instability.

Since with the aforedescribed training device no torque compensation is needed, the trainee must learn torque compensation on the aircraft when the latter has a motor-driven rotor and a stern rotor.

It is an object of the present invention to provide a training device for helicopter pilots which device is capable of effecting all flying conditions occurring on a reaction rotor driven helicopter and also affords learning the torque compensation needed in mechanically driven helicopters. According to the invention a selectively operable nozzle is built into the stern of the helicopter fuselage and is supplied with a portion of the gas for driving the rotor. This nozzle is unmovable relative to the fuselage. The thrust produced by said nozzle simulates the imperfection of the torque compensation of a mechanically driven helicopter of a size corresponding to that of the training device.

In a mechanically driven helicopter having a stern rotor the equilibrium between the rotor reaction moment and compensation moment produced by the stern rotor is disturbed whenever the driving power is altered. The helicopter tends to rotate in the direction opposite to the direction of rotation of the rotor upon increasing driving power. The nozzle arrangement in the training device according to the invention produces a moment which corresponds to the imperfections of the torque compensation in a mechanically driven helicopter having a stern rotor. In the device disclosed in patent application Serial No. 266,735, filed March 20, 1963 a small fan, driven, for example, by a small electric motor, is provided for producing a similar effect as a rudder. Torque compensation can be effected by this arrangement. According to the invention torque compensation is effected by means of a nozzle provided at the stern of the fuselage, the direction of the jet emerging from the nozzle being adjustable. This nozzle is simpler, less expensive, and more reliable in operation than a motor-driven fan producing an air current acting on a rudder.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 is a schematic side elevation of a training apparatus according to the invention.

FIG. 2 is a diagrammatic illustration of a detail of the apparatus shown in FIG. 1.

Referring more particularly to FIG. 1 of the drawing numeral 1 designates a fuselage provided with a tripod landing frame 2 and a tail unit carrier 3. Numerals 5 designate rotor blades extending from a head or hub 4 and having outer ends provided with outlet nozzles, not shown, for a driving gas. Numeral 8 designates a seat for the trainee. Numeral 6 designates pedals. Numeral 7 designates a lever or arm controlling the collective pitch angle of the rotor blades and, by rotation of the handle 7″, supply of operating gas to the rotor. Numeral 7′ designates a lever for controlling the cyclic pitch angle of the rotor blades. The training apparatus is moored to the ground by a rope 19 preferably connected to the apparatus at the center of gravity thereof.

Operating gas is supplied through a hose 9 to a distributor 20 wherefrom the gas is conducted through two hoses 10 to the rotor blades. A conduit 11 conducts operating gas from the distributor 20 to a nozzle 13 at the stern of the tail unit carrier 3. The nozzle 13 is placed at a location corresponding to the location of the center of the stern rotor of a mechanically operated helicopter whose size corresponds to that of the training apparatus. The direction of the jet leaving the nozzle 13 is the same as the direction of rotation of the rotor 4, 5. During operation of the training apparatus the position of the nozzle 13 on the tail unit is fixed. The power of the jet produced by the nozzle is adjustable and the jet acts on a lever arm extending from the center of gravity of the training apparatus and produces a torque corresponding to the imperfections of the torque compensation in a mechanically driven helicopter. Supply of operating gas to the nozzle 13 is controlled by a valve 16 which is actuated by a rope or cable 15 actuated by the lever 7 or by the rotatable handle 7″ respectively.

A nozzle 12 swingable on a vertical axis 17 is mounted at the stern of the tail unit carrier 3 and receives operating gas from the conduit 11. The position of the nozzle 12 can be adjusted by means of a rope 18 connected to the pedals 6.

Supply of operating gas to the nozzle 13 is stopped when the apparatus is used for training a pilot for a reaction helicopter. When operating gas is supplied to the nozzle 13 the apparatus simulates a mechanically driven helicopter. In the latter case means are preferably provided which automatically permit supply of operating gas to the nozzle 13 only when the rotor-driving reaction force exceeds a predetermined value, for example when so much operating gas is supplied to the rotor as to lift the apparatus from the ground.

A mechanism for automatically effecting supply of operating gas to the nozzle 13 upon a predetermined supply of operating gas to the reaction nozzles of the rotor blades is shown in FIG. 2. The arm 7 is provided in the conventional manner with a rotatable handle 7″ for actuating a conventional device 14 for controlling the supply of operating gas to the rotor. Upon rotation of the handle 7″ and of the arm 7 a worm wheel 21 is rotated and an arm 22 extending from the worm wheel or its shaft is also rotated. The arm 22 can be rotated freely until the handle 7″ and the gear wheel 21 are turned through an angle corresponding to a predetermined supply of operating gas to the rotor. When this supply is reached the end of the arm 22 abuts against a lever 23 whereto the cable 15 is connected and turns the lever 23 to effect opening of the valve 16.

The parts of the training apparatus forming the invention operate as follows:

Operating gas is blown out of the nozzle 13 in the direction of rotation of the rotor blades 5 upon an increased supply of operating gas or air to the blades 5. The reaction of the jet emerging from the nozzle 13 tends to turn the training apparatus in a direction opposite to the direction of rotation of the rotor and the pilot must take steps to counteract this rotation. As in a mechanically driven helicopter the stern rotor is controlled by actuating the rudder pedals in the apparatus according to the invention the pedals 6 are actuated for swinging the rudder nozzle 12 in order to counteract the turning moment produced by the nozzle 13. The thrust produced by the latter not only tends to rotate the apparatus but also to move it in a lateral direction.

Assuming equilibrium between the moment produced by the nozzle 13 and the countermoment produced by the rudder nozzle 12 an increase of supply of driving gas to the rotor does not change the equilibrium of these moments, because supply of operating gas is also increased to the nozzles 13 and 12. The training apparatus, therefore, remains in a balanced condition. In order to unbalance the training apparatus a valve 16 is provided for controlling the supply of operating gas to the nozzle 13. This valve is opened or closed depending on the control maneuvers effected by the pilot, which maneuvers would change the turning moment of a mechanically driven helicopter. In the illustrated example a connection is provided between the lever 7 for controlling the supply of operating gas to the rotor and the valve 16. Rotation of the handle 7" of the lever 7 effects control of the supply of operating gas by means of a device 14 to the rotor in the conventional manner. The device 14 is also connected through the cable 15 to the valve 16. The latter may be connected to other control devices, for example to a mechanism for controlling the pitch angle of the rotor blades. With the apparatus according to the invention alternation of the rotor output simultaneously affects the valve 16 for disturbing the equilibrium between the effect of the nozzle 13 and the nozzle 12. For restoring the equilibrium the pilot must actuate the rudder pedals 6.

With the training apparatus according to the invention pilots may be trained for operating reaction rotor helicopters as well as mechanically driven helicopters. The nozzle arrangement 12, 13 according to the invention is simple, sturdy and less complicated than conventional devices deigned to produce similar effects.

I claim:

1. An apparatus for training helicopter pilots, comprising:
    a device capable of leaving the ground and including:
    a fuselage having a stern portion,
    a pilot's seat mounted on said fuselage,
    a jet driven reaction rotor mounted on said fuselage and capable to lift said device from the ground,
    a source of driving gas resting on the ground,
    conduit means interconnecting said source and said rotor for supplying driving gas thereto,
    a nozzle mounted on said stern portion for producing a jet effecting a thrust simulating the imperfections of torque equilibrium of a mechanically driven helicopter whose size corresponds to that of the training apparatus,
    said nozzle being connected to said conduit means for receiving operating gas therefrom,
    adjustable antitorque means mounted on said stern portion for counteracting the effect of said nozzle,
    adjusting means operatively connected to said nozzle for adjusting the thrust effected by said nozzle,
    adjusting means operatively connected to said antitorque means for adjusting said antitorque means, and
    control means operable by the student for controlling the operation of said device,
    said control means being operatively connected to said adjusting means for actuation of said adjusting means upon actuation of said control means.

2. An apparatus as defined in claim 1 wherein said antitorque means adjusting means includes valve means for adjusting the supply of operating gas to said nozzle.

3. An apparatus as defined in claim 1 wherein said nozzle is unmovable relative to said fuselage and is placed at the elevatioin of the rotation axis of the stern rotor of a mechanically driven helicopter whose size corresponds to that of the training apparatus, the direction of the jet produced by said nozzle being the same as the direction of rotation of said jet driven reaction rotor.

4. An apparatus as defined in claim 1 wherein said control means are constructed and arranged to control the supply of operating gas to said rotor.

5. An apparatus for training helicopter pilots, comprising:
    a device capable of leaving the ground and including:
    a fuselage having a stern portion,
    a pilot's seat mounted on said fuselage,
    a jet driven reaction rotor mounted on said fuselage and capable to lift said device from the ground,
    a source of driving gas resting on the ground,
    conduit means interconnecting said source and said rotor for supplying driving gas thereto,
    a first nozzle rigidly mounted on said stern portion for producing a jet effecting a thrust simulating the imperfections of torque equilibrium of a mechanically driven helicopter whose size corresponds to that of the training apparatus, and
    a second nozzle separate from said first nozzle and swingably mounted on said stern portion for producing a jet acting as a rudder for counteracting the effect of said first nozzle,
    adjusting means operatively connected to said first nozzle for adjusting the thrust effected by said first nozzle,
    adjusting means operatively connected to said second nozzle for adjusting the angular position of said second nozzle,
    control means operable by the trainee and operatively connected to said adjusting means for actuation of said adjusting means upon operation of said control means.

6. An apparatus according to claim 5 including means associated with said first nozzle for controlling the flow of operating gas to said first nozzle.

7. An apparatus for training helicopter pilots, comprising:
    a fuselage having a stern portion,
    a pilot's seat mounted on said fuselage,
    a jet driven reaction rotor mounted on said fuselage and capable to lift said device from the ground,
    a source of driving gas resting on the ground,
    conduit means interconnecting said source and said rotor for supplying driving gas thereto,
    a nozzle mounted on said stern portion for producing a jet effecting a thrust simulating the imperfections of torque equilibrium of a mechanically driven helicopter whose size corresponds to that of the training apparatus,
    said nozzle being connected to said conduit means for receiving operating gas therefrom,
    first adjusting means operatively connected to said nozzle for adjusting the thrust effected by said nozzle,
    adjustable antitorque means mounted on said stern portion for counteracting the effect of said nozzle, second adjusting means operatively connected to said antitorque means for adjusting said antitorque means, and control means operable by the trainee and including means operatively connected to said adjusting means for actuation of said adjusting means upon actuation of said control means, said control means including means for controlling the supply of driving gas to said rotor and means for rendering said nozzle ineffective when said driving gas supply control means effect a supply of driving gas to said rotor which supply is below a predetermined value.

References Cited by the Examiner

UNITED STATES PATENTS

| | | | |
|---|---|---|---|
| 2,419,604 | 4/1947 | Stanley | 244—17.19 |
| 2,486,272 | 10/1949 | Gazda | 244—17.19 |
| 2,518,697 | 8/1950 | Lee | 244—17.19 |
| 2,954,614 | 10/1960 | Vogt | 35—12 |
| 2,973,652 | 3/1961 | Kelch | 74—54 |
| 3,047,254 | 7/1962 | Spearman et al. | 244—17.19 X |
| 3,093,927 | 6/1963 | Smith | 46—77 |

EUGENE R. CAPOZIO, *Primary Examiner.*

JEROME SCHNALL, LEONARD V. VARNER,
*Examiners.*